F. T. GRIMES,
Assignor, by mesne assignments, to M. HICKS and T. SMITH.
LAMP.
No. 10,050. Reissued Mar. 7, 1882.
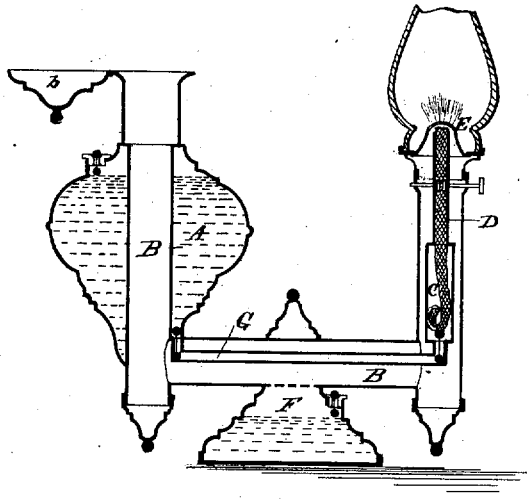
Witnesses,
F. B. Townsend
A. W. Munday
Inventor:
Franklin T. Grimes
per
Munday & Evarts
Attorneys
N. PETERS, Photo-Lithographer, Washington, D. C.

UNITED STATES PATENT OFFICE.

FRANKLIN T. GRIMES, OF LIBERTY, MO., ASSIGNOR, BY MESNE ASSIGNMENTS, TO MICHAEL HICKS AND THOMAS SMITH, OF NEW YORK, N. Y.

LAMP.

SPECIFICATION forming part of Reissued Letters Patent No. 10,050, dated March 7, 1882.

Original No. 110,648, dated January 3, 1871. Application for reissue filed June 3, 1879.

*To all whom it may concern:*

Be it known that I, FRANKLIN T. GRIMES, of Liberty, in the county of Clay and State of Missouri, have invented a new and useful Improvement in Lamps, of which the following is a full, clear, and exact description, reference being had to the accompanying drawing, forming part of this specification, and which represents a sectional elevation of a lamp constructed in accordance with my improvement.

Referring to the accompanying drawing, A represents the oil-reservoir, and B the air tube or passage arranged to pass downwardly through said reservoir, and from thence to or around the wick-chamber C from below, and up around the wick-tube D to the burner E. Said air-passage may be furnished with a lid, *b*, at its top, to close it when the lamp is not in use.

F is a water base or stand for support of the lamp, and which may communicate by suitable orifices with the lower branch of the air-passage B, so that, while said base serves to give steadiness to the lamp when in use, in case of the lamp upsetting the water will flow out of said base into the air-passage to extinguish the flame. Said water-chamber F, as also the oil-reservoir A, may each be provided with valves to air-orifices made therein, or in their screw-caps or filling-nozzles, so constructed and operating that, while not excluding air from entering when the lamp is in an upright position, fluid is prevented from escaping in case of the lamp upsetting.

The wick-chamber C is supplied with oil from the reservoir A by a tube, G, arranged within the lower connecting-branch of the air tube or passage, and provided at its opposite ends with a valve or valves that operate to admit of flow under ordinary conditions, and in an erect position of the lamp, but which close the communication between said reservoir and chamber should the lamp be upset. The valve that controls ingress from the reservoir closes in case of an explosion within the wick-chamber, and thereby prevents ignition extending to the oil-reservoir.

The arrangement herein described of the air-passage B insures, first, the descent of the cold and heavier air through the oil in the reservoir, keeping the oil cool, and afterward the ascent of the air under rarefaction of it by the flame, thus maintaining a most perfect circulation or current through the lamp, and contributing alike to its safety and brilliancy or steadiness in burning. The same arrangement is applicable to other constructions of lamps employing a detached wick-chamber—as, for instance, to a student's lamp—and which is adjustable up or down on a vertical rod or post under lock by a set-screw, and to chandeliers in which a central oil-reservoir is made to supply a series of branch lights arranged around it. This arrangement establishes a current in which the cold and denser air is made to assume its natural downward course, keeping the oil in the reservoir cool, and thereby reducing the risk of an explosion, and afterward, as it approaches the flame, to assume its natural upward course of a heated current.

It will be noticed that all of the air to supply combustion is furnished by the tube or air-passage B, and is taken by a circuitous passage from a point above the flame, and somewhat distant, and conveyed into the closed burner to the flame. The effect of local drafts and currents is thus avoided, and by this means is the steadiness of burning above referred to attained, which makes this lamp peculiarly adapted to railroad-cars and steamboats.

What is here claimed, and desired to be secured by Letters Patent, is—

1. In a lamp, the combination of an oil-reservoir, A, air-supply tube B, passing through said reservoir and thence to the burner, an oil-conducting passage, G, and a closed burner, E, the wick-tube being set apart from the oil-reservoir, and to one side thereof, and connected therewith by the air-tube B and oil-tube G, whereby the heat from the flame will not come into contact with the reservoir, substantially as described.

2. In a lamp, the combination of an oil-reservoir, A, an air-supply tube, B, passing through said reservoir in the direction of the greatest length of the latter, to thoroughly cool the oil, and thence to the closed burner E, oil-conducting tube G, wick-chamber C, and the said closed burner E, the wick-tube being set apart from and to one side of the oil-reservoir A, whereby the heat from the flame will not come into contact with the latter, substantially as described.

3. In a lamp, the combination of an oil-reservoir, A, an air-supply conduit, B, the walls of which are in contact with the oil in the reservoir, the wick-tube C, and closed burner E, to which latter the air is conducted by the conduit B, the said wick-tube being arranged or set away from and to one side of said oil-reservoir A, and connected therewith by the air and oil tubes or conduits B G, whereby the oil is thoroughly cooled by the passage of air to the burner, and the heat from the flame will not come into contact with the oil-reservoir, substantially as described.

4. In a lamp, the combination of oil-reservoir A, air-conduit B, the walls of which are in contact with the oil in the reservoir, a separate wick-chamber, C, the latter being arranged away from and to one side of the reservoir, and the connecting air and oil tubes B G, all arranged substantially as shown, to cool and preserve the oil at a low temperature, and the closed burner E, the chimney of which is set directly upon the burner, closely inclosing it, whereby all the air supplied by tube B comes into direct contact therewith, and the products of combustion are completely and immediately carried away by the chimney.

F. T. GRIMES.

Witnesses:
J. L. SECOR,
C. ANDREAS.